(12) United States Patent
Garsault et al.

(10) Patent No.: US 12,071,832 B2
(45) Date of Patent: Aug. 27, 2024

(54) SAFETY VALVE

(71) Applicant: Schlumberger Technology Corporation, Sugar Land, TX (US)

(72) Inventors: Sylvain Garsault, Antony (FR); Hy Phan, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/904,657

(22) PCT Filed: Feb. 24, 2021

(86) PCT No.: PCT/US2021/019366
§ 371 (c)(1),
(2) Date: Aug. 19, 2022

(87) PCT Pub. No.: WO2021/173633
PCT Pub. Date: Sep. 2, 2021

(65) Prior Publication Data
US 2023/0151714 A1    May 18, 2023

Related U.S. Application Data (60) Provisional application No. 62/980,839, filed on Feb. 24, 2020.

(51) Int. Cl.
*E21B 47/12* (2012.01)
*E21B 34/06* (2006.01)

(52) U.S. Cl.
CPC ............ *E21B 34/066* (2013.01); *E21B 47/12* (2013.01); *E21B 2200/05* (2020.05)

(58) Field of Classification Search
CPC ..... E21B 47/12; E21B 2200/05; E21B 34/066
See application file for complete search history.

(56) References Cited

U.S. PATENT DOCUMENTS

| | | | |
|---|---|---|---|
| 2,530,966 A * | 11/1950 | Huber ................... | E21B 43/116 166/227 |
| 6,433,991 B1 | 8/2002 | Deaton et al. | |
| 8,267,167 B2 * | 9/2012 | Lake ..................... | E21B 34/066 166/66.5 |
| 8,555,956 B2 | 10/2013 | Veneruso et al. | |
| | | (Continued) | |

FOREIGN PATENT DOCUMENTS

| | | |
|---|---|---|
| WO | 2013177212 A1 | 11/2013 |
| WO | 2019089487 A1 | 5/2019 |

OTHER PUBLICATIONS

International Search Report and Written Opinion issued in PCT/US2021/019366, dated Jun. 11, 2021 (11 pages).

*Primary Examiner* — D. Andrews
*Assistant Examiner* — Ronald R Runyan
(74) *Attorney, Agent, or Firm* — Jeffrey D. Frantz (57) ABSTRACT

A well completion including an electric safety valve and a female inductive coupler is provided. A corresponding male inductive coupler is aligned with the female inductive coupler to provide for the transfer of power and/or telemetry during deployment. The male inductive coupler can be removed for normal operation. In the event of safety valve failure during operation, a service male inductive coupler and contingency safety valve can be deployed such that the service male inductive coupler is aligned with the female inductive coupler.

18 Claims, 5 Drawing Sheets

(56) References Cited

U.S. PATENT DOCUMENTS

| | | | |
|---|---|---|---|
| 10,612,369 B2* | 4/2020 | Dufour | E21B 47/12 |
| 2002/0114216 A1* | 8/2002 | Veneruso | E21B 17/0283 |
| | | | 367/83 |
| 2005/0230118 A1 | 10/2005 | Noske et al. | |
| 2007/0295504 A1 | 12/2007 | Patel | |
| 2010/0025045 A1 | 2/2010 | Lake et al. | |
| 2017/0350197 A1 | 12/2017 | Sugiura et al. | |
| 2023/0228175 A1* | 7/2023 | Poizat | E21B 43/04 |
| | | | 166/313 |

* cited by examiner

SAFETY VALVE

CROSS-REFERENCE PARAGRAPH

This application is a national stage entry under 35 U.S.C. 371 of International Application No. PCT/US2021/019366, entitled "SAFETY VALVE," filed Feb. 24, 2021, which claims the benefit of U.S. Provisional Application No. 62/980,839, entitled "Safety Valve," filed Feb. 24, 2020, the disclosure of which is incorporated herein by reference in its entirety.

BACKGROUND

Field

The present disclosure generally relates to safety valves, and more particularly to use of inductive couplers with electrical safety valves.

Description of the Related Art

Hydrocarbon fluids such as oil and natural gas are obtained from a subterranean geologic formation, referred to as a reservoir, by drilling a wellbore that penetrates the hydrocarbon-bearing formation. Once the wellbore is drilled, various forms of well completion components may be installed to control and enhance the efficiency of producing the various fluids from the reservoir. Valves typically are used in a well for such purposes as fluid flow control, formation isolation, and safety functions. In some wells, for example, valves are actuated between open and closed states to compensate or balance fluid flow across multiple zones in the wellbore. In other wells, an isolation valve may be actuated to a closed position to shut in or suspend a well for a period of time and then opened when desired. Often a well includes a subsurface valve to prevent or limit the flow of fluids in an undesired direction.

SUMMARY

In some configurations, a well completion includes: a tubing hanger; tubing extending from the tubing hanger; an electric safety valve disposed along the tubing; and a female inductive coupler disposed along the tubing between the tubing hanger and the electric safety valve.

The electric safety valve can include a valve and an actuator. The actuator can be an electro-hydraulic pump, an electro-hydraulic actuator, or an electro-mechanical actuator. The electric safety valve can include a flapper valve.

The well completion can further include a service male inductive coupler configured to be disposed within the tubing during deployment of the well completion such that the service male inductive coupler is aligned with the female inductive coupler, the service male inductive coupler configured to facilitate transfer of power and/or telemetry data to and/or from the electric safety valve. The well completion can further include one or more wires extending between and connecting the electric safety valve and the tubing hanger, wherein in normal operation, the female inductive coupler is configured to be transparent and allow for a wired connected between the electric safety valve and the tubing hanger. The one or more wires can include a first wire extending between and connecting the tubing hanger and the female inductive coupler and a second wire extending between and connecting the female inductive coupler and the electric safety valve.

The well completion can further include a workstring configured to be disposed within the tubing during an intervention operation of the well completion, the workstring comprising an intervention male inductive coupler and a contingency electric safety valve connected by a wire, the workstring disposed within the tubing such that the intervention male inductive coupler is aligned with the female inductive coupler. In some configurations, there is no electrical wiring extending from the intervention male inductive coupler to the surface and power and/or telemetry is provided to the contingency electric safety valve via the female inductive coupler. An outer diameter of the contingency electric safety valve can be smaller than an inner diameter of the electric safety valve.

A method of intervention for such a well completion in the case of failure of the electric safety valve can include deploying a workstring in the tubing, the workstring comprising a contingency electric safety valve and an intervention male inductive coupler, until the intervention male inductive coupler is aligned with the female inductive coupler; and providing power and/or telemetry to and/or from the contingency electric safety valve via the intervention male inductive coupler and the female inductive coupler.

In some configurations, a method of deploying a well completion includes disposing a tubing string in a well, the tubing string comprising an electric safety valve and a female inductive coupler disposed above the electric safety valve; inserting a service male inductive coupler within the tubing string such that the service inductive male coupler is aligned with the female inductive coupler; and retrieving the service male inductive coupler.

The method can further include transferring power and/or telemetry to and/or from the electric safety valve via the female inductive coupler and the service male inductive coupler. After retrieving the service male inductive coupler, the method can include transferring power and/or telemetry to and/or from the electric safety valve via a wired connection between the surface and the electric safety valve during normal operation. Transferring power and/or telemetry to and/or from the electric safety valve via the wired connection can include transferring power and/or telemetry via a first wire extending from a tubing hanger to the female inductive coupler and a second wire extending from the female inductive coupler to the electric safety valve.

In some configurations, a method of intervention for a well completion includes deploying a workstring within tubing of the well completion, the well completion comprising an electric safety valve and a female inductive coupler positioned along the tubing, and the workstring comprising an intervention male inductive coupler, a contingency electric safety valve, and a wire extending between and connecting the intervention male inductive coupler and the contingency electric safety valve; and positioning the workstring within the tubing such that the intervention male inductive coupler is aligned with the female inductive coupler.

The method can further include positioning the workstring within the tubing such that the contingency electric safety valve is positioned at least partially below the electric safety valve such that production fluid flows through the contingency electric safety valve, bypassing the electric safety valve. The method can include providing power and/or telemetry to and/or from the contingency electric safety valve via the intervention male inductive coupler and the female inductive coupler.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Well completions often include various valves, such as safety valves and flow control valves. Downhole or sub-surface safety valves are often deployed in an upper part of a well completion to provide a barrier against uncontrolled flow below the valve. The valve must be able to operate in a failsafe mode to close and stop well production in case of an emergency. Typically such valves have been hydraulically operated. However, hydraulically operated valves have limitations. For example, the use of a hydraulically-operated valve is depth-limited due to the high hydrostatic pressure acting against the valve at large depths, which may diminish the effective hydraulic pressure that is available to operate the valve. Furthermore, for deep applications, the viscous control fluid in a long hydraulic line may cause unacceptably long operating times for certain applications. In addition, a long hydraulic line and the associated connections provide little or no mechanism to determine, at the surface of the well, what is the true state of the valve. For example, if the valve is a safety valve, there may be no way to determine the on-off position of the valve, the pressure across the valve and the true operating pressure at the valve's operator at the installed depth.

Compared to hydraulic completion systems, electric completion systems can provide reduced capital expenditures, reduced operating expenditures, and reduced health, safety, and environmental problems. Electric completions can advantageously allow for the use of sensors and proactive decision making for well control.

The present disclosure provides electric safety valves, systems (e.g., well completions) including such electric safety valves, and methods of deploying, operating, and providing intervention for electric safety valves. In some configurations, an inductive coupler is used with an electric safety valve or completion including an electric safety valve.

Figure 1A:
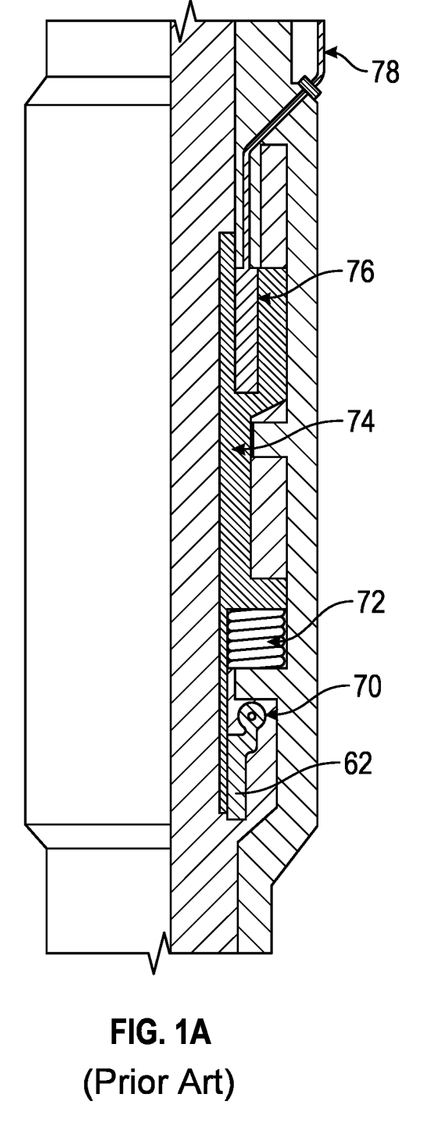
FIG. 1A illustrates an example conventional downhole safety valve in an open position.
Figure 1B:
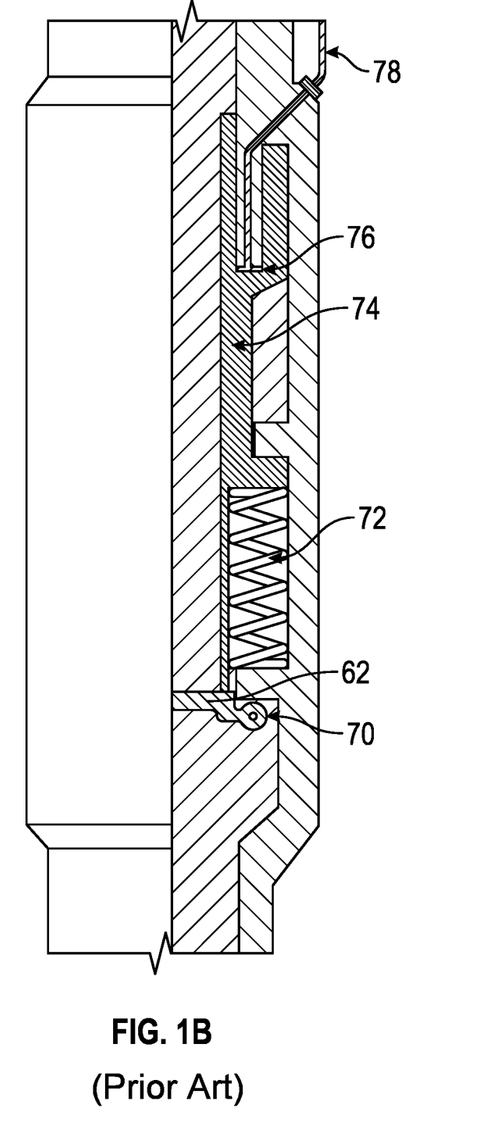
FIG. 1B illustrates the conventional downhole safety valve of FIG. 1A in a closed position.

Conventional downhole safety valves are typically operated via a hydraulic connection to or from a surface panel. FIGS. 1A and 1B illustrate an example hydraulic safety valve having a flapper valve design in open and closed positions, respectively. As shown, the safety valve assembly includes a flapper 62, a return spring 72, a flow tube or sleeve 74, a piston 76, and a control line 78. The position (open or closed) of the flapper 62 is controlled via the flow tube or sleeve 74 sliding up and down inside the production tubing. The sleeve position is controlled or moved by the return spring 72 and/or the piston 76. The flapper 62 and return spring 72 are biased to the closed position.

Hydraulic pressure applied from the surface via the control line 78 to the piston 76 causes the piston 76 to move the sleeve 74 downward, thereby compressing the return spring 72, and open the flapper 62. Hydraulic pressure in the piston 76 maintains the sleeve's position and holds the valve open. As shown, at least a portion of the flapper 62 is shielded from flow through the production tubing by a portion of the sleeve 74, so the sleeve 74 protects the flapper 62 and tubing sealing area from flow erosion. If the hydraulic pressure in the control line 78 is released, whether intentionally or unintentionally, the spring 72 bias pushes the sleeve 74 upward, allowing the flapper 62 to close. The spring 72 and/or flapper 62 bias to the closed position provides a failsafe for the valve, as the spring 72 ensures valve closure in case of emergency, such as a catastrophic event on the surface leading to a pressure drop or loss in the hydraulic control line 78.

Figure 2:
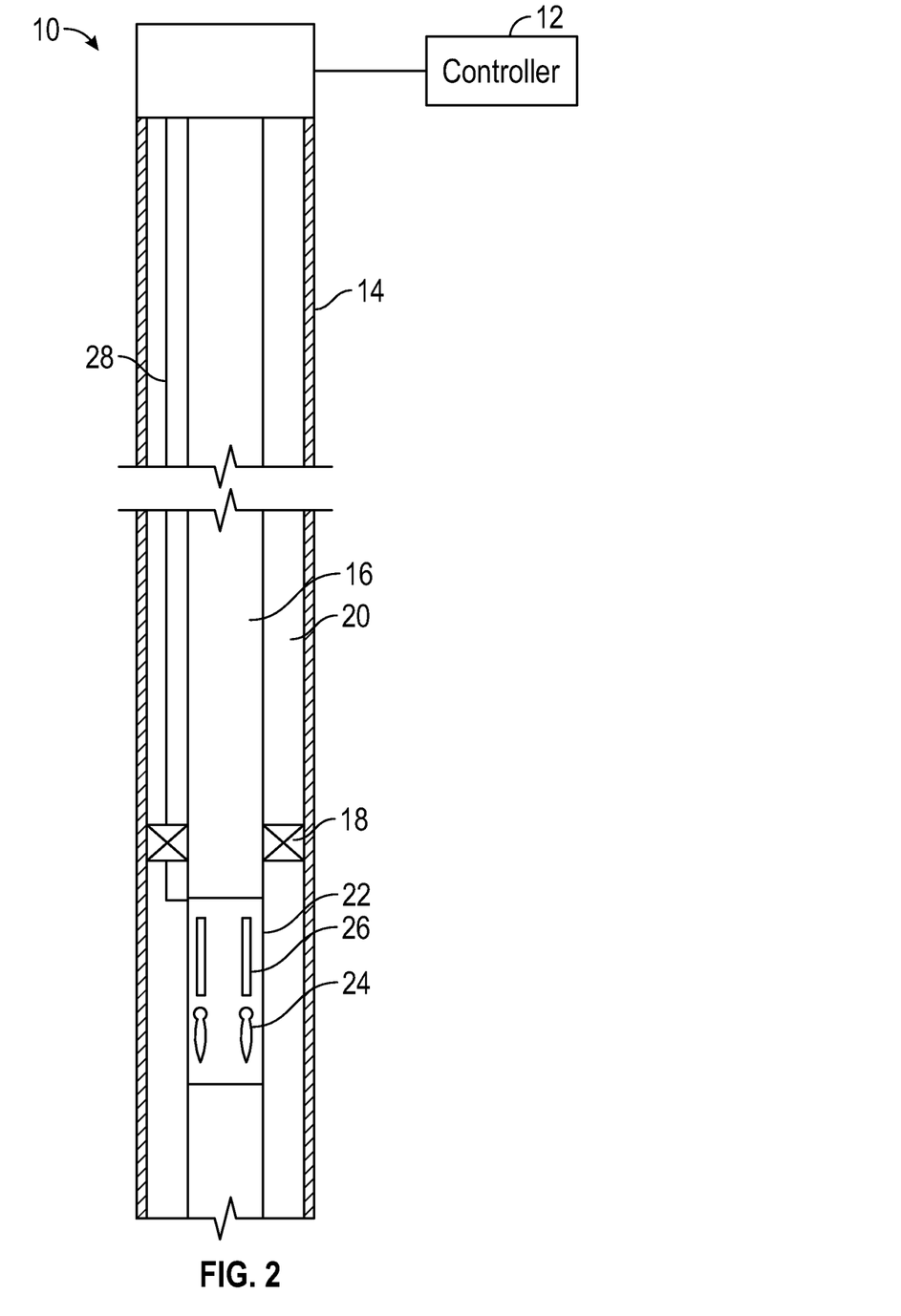
FIG. 2 illustrates an embodiment of a completion string having a sub-surface safety valve in a wellbore.

FIG. 2 illustrates an example completion string including a safety valve according to the present disclosure positioned in a wellbore 10. The wellbore 10 may be part of a vertical well, deviated well, horizontal well, or a multilateral well. The wellbore 10 may be lined with casing 14 (or other suitable liner) and may include a production tubing 16 (or other type of pipe or tubing) that runs from the surface to a hydrocarbon-bearing formation downhole. A production packer 18 may be employed to isolate an annulus region 20 between the production tubing 16 and the casing 14.

A subsurface safety valve assembly 22 may be attached to the tubing 16. The subsurface safety valve assembly 22 may include a flapper valve 24 or some other type of valve (e.g., a ball valve, sleeve valve, disk valve, and so forth). The flapper valve 24 is actuated opened or closed by an actuator assembly 26. During normal operation, the valve 24 is actuated to an open position to allow fluid flow in the bore of the production tubing 16. The safety valve 24 is designed to close should some failure condition be present in the wellbore 10 to prevent further damage to the well.

The actuator assembly 26 in the safety valve assembly 22 may be electrically activated by signals provided by a controller 12 at the surface to the actuator assembly 26 via an electrical cable 28. The controller 12 is therefore operatively connected to the actuator assembly 26 via the cable 28. Other types of signals and/or mechanisms for remote actuation of the actuator assembly 26 are also possible. Depending on the application, the controller 12 may be in the form of a computer-based control system, e.g. a microprocessor-based control system, a programmable logic control system, or another suitable control system for providing desired control signals to and/or from the actuator assembly 26. The control signals may be in the form of electric power and/or data signals delivered downhole to subsurface safety valve assembly 22 and/or uphole from subsurface safety valve assembly 22.

Figure 3:
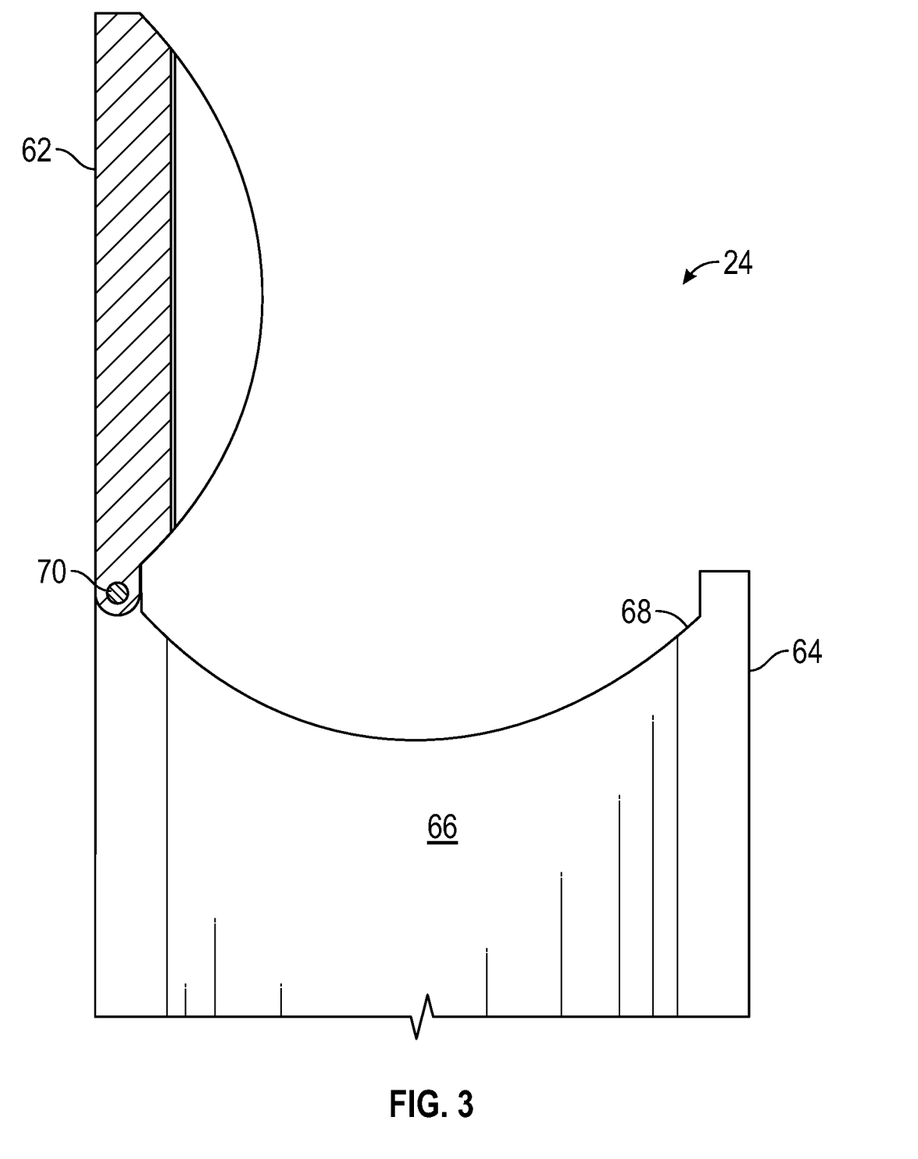
FIG. 3 is a cross-sectional illustration of an example of a flapper valve which may be utilized in a downhole system.

FIG. 3 illustrates an example flapper valve 24. In this embodiment, the flapper 62 is pivotably mounted along a flapper housing 64 having an internal passage 66 therethrough and having a hard sealing surface 68. The flapper 62 is pivotably coupled to the flapper housing 64, for example, via a hinge pin 70, for movement between an open position and a closed position. By pivotably coupled, it should be understood the flapper 62 may be directly coupled to housing 64 or indirectly coupled to the housing 64 via an intermediate member.

The actuator assembly 26 can be or include various types of actuators, such as electrical actuators. For example, in some configurations, the actuator assembly 26 is or includes an electro hydraulic actuator (EHA), an electro mechanical actuator (EMA), or an electro hydraulic pump (EHP). An EHA can allow for quick backdrive or actuation and therefore quick close functionality, which advantageously allows for rapid closure of the valve 24 when desired or required.

Figure 4:
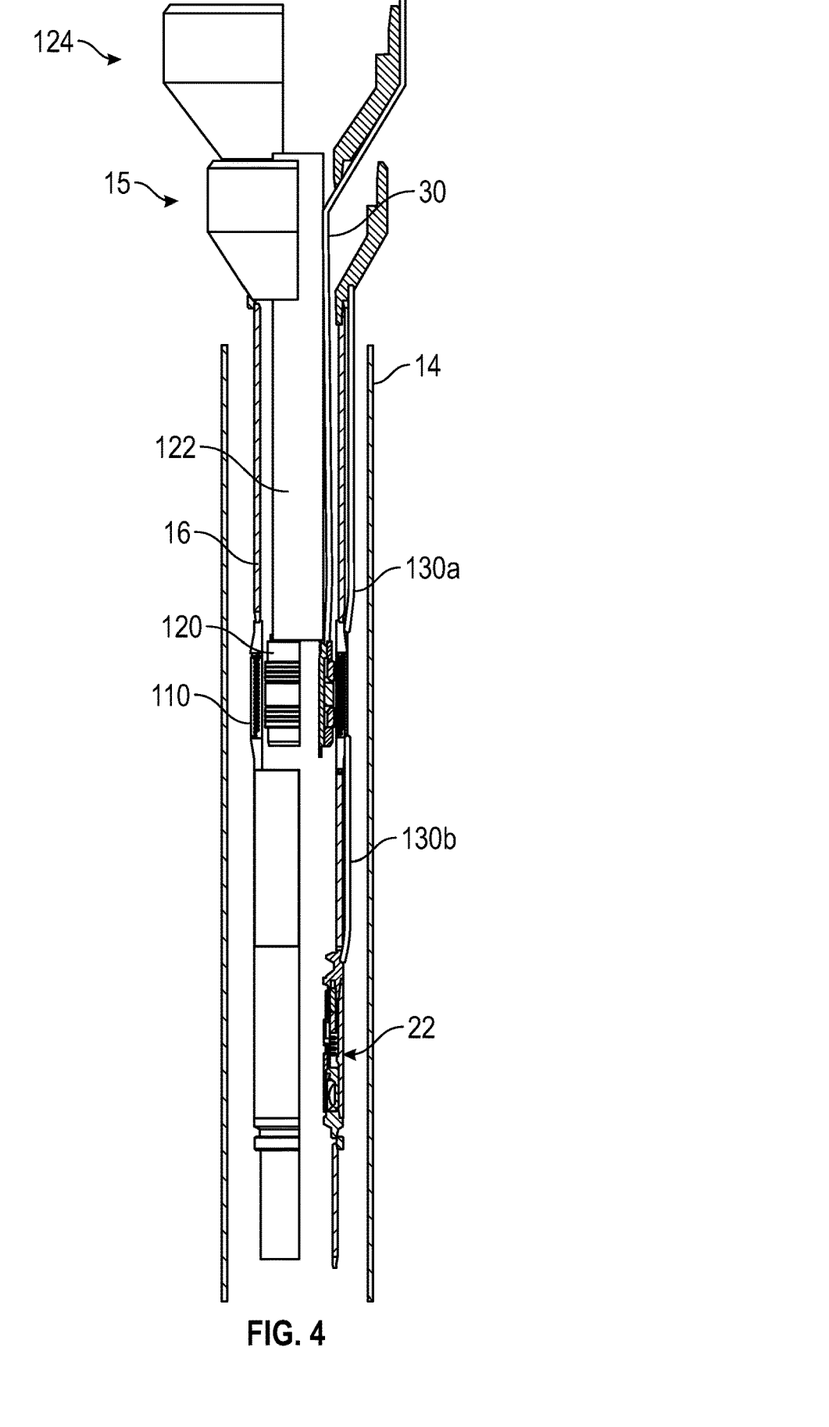
FIG. 4 schematically shows an example completion string deployed or installed in a well.

FIG. 4 schematically shows an example completion string deployed or installed within a casing 14 in a well. The completion string includes one or more sections of tubing 16 disposed within the casing 14. As shown, a female inductive coupler 110 is mounted between (e.g., axially between) a tubing hanger 15 and an electric safety valve 22. The female inductive coupler 110 can be mounted along the tubing 16 as shown, for example, in, on, or along a section of tubing 16 or between sections of tubing 16. The female inductive coupler 110 is therefore mounted above the electric safety valve 22. The female inductive coupler 110 can be a permanent component in the completion string.

The electric safety valve 22 can have various configurations, features, and structures. For example, systems and methods according to the present disclosure can include an electric safety valve and/or features as described in, for example, PCT Publication WO 2019/089487, U.S. Pat. No. 6,433,991, or U.S. Pat. No. 8,555,956, the entirety of each of which is hereby incorporated by reference herein, the present application, and/or any other appropriate safety valve or features.

During deployment or installation of the completion string, a service male inductive coupler 120 allows or provides for the transfer of power and/or telemetry to and/or from the electric safety valve 22, e.g., to or from the surface. The service male inductive coupler 120 can transfer power and/or telemetry to the electric safety valve 22 without interfering with the electrical connector of the tubing hanger 15. In some configurations, the service male inductive coupler 120 receives and/or transmits power and/or telemetry data to or from the surface via a wire 30. In some configurations, the service male inductive coupler 120 transmits and/or receives power and/or telemetry data to or from the safety valve 22 via the female inductive coupler 110 and a wire 130*b*. The male inductive coupler 120 can transmit and/or receive power and/or telemetry data to or from the female inductive coupler 110, and the female inductive coupler 110 can transmit and/or receive power and/or telemetry data to or from the electric safety valve 22 via wire 130*b*.

The service male inductive coupler 120 can be coupled to an inner work string 122 as shown in FIG. 4 (for example, an end of the inner work string). The inner work string 122 and/or service male inductive coupler 120 are deployed or inserted within the tubing 16 until the service male inductive coupler 120 is aligned with, e.g., radially aligned with and/or at generally or about the same axial depth as, the female inductive coupler 110. The service male coupler 120 and/or inner work string 122 can be wired to the deployment string, e.g., tubing 16, via the tubing hanger 15 and a tubing hanger running tool 124.

Once an integrity check during deployment or installation is completed, the service male coupler 120 can be retrieved and removed with the tubing hanger running tool 124. For normal operation, the female coupler 110 can be transparent and act as a wired connection to the tubing hanger 15. When there is no corresponding male coupler in normal operation, power and/or telemetry can be transmitted or passed from the tubing hanger 15 to the safety valve 22 via a direct wired connection, e.g., via wires 130*a* and 130*b* as shown in FIG. 4.

In some circumstances, intervention of the completion string might be needed, for example, due to failure of the safety valve 22. Traditionally, intervention of a hydraulic safety valve requires several trips to lock open the failed safety valve, puncture the hydraulic line to later power a contingency safety valve, and to deliver the contingency safety valve.

Figure 5:
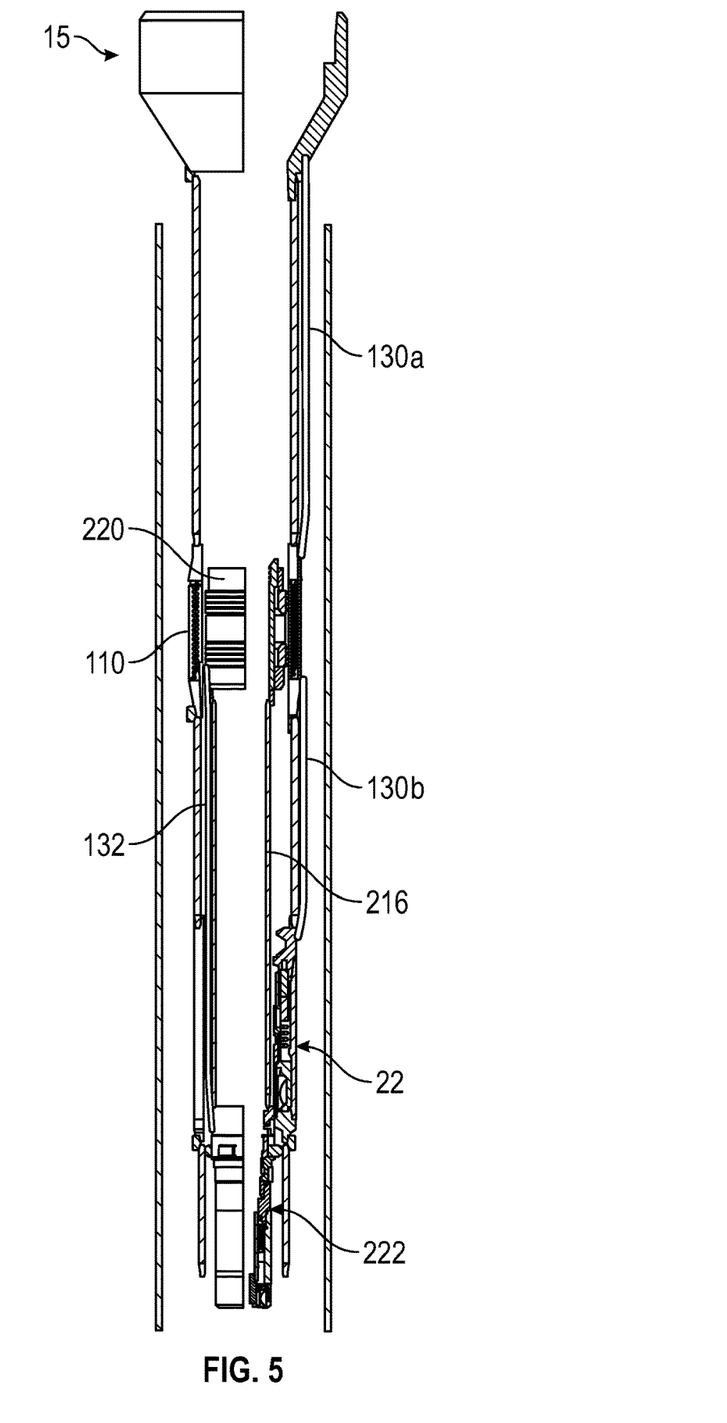
FIG. 5 schematically shows an example intervention assembly inserted into a completion installed in a well.

With an electric safety valve 22, for example according to the present disclosure, a contingency electric safety valve 222 can be deployed inside the primary failed safety valve 22 without extra trips or steps to lock open the failed safety valve and/or to sever or disconnect the electrical line. As shown in FIG. 5, a workstring including a production or intervention male inductive coupler 220 and a contingency electric safety valve 222 (which may be a smaller electric safety valve and have a smaller outer diameter than an inner diameter of the electric safety valve 22) wired together (e.g., via wire(s) 132) can be deployed or inserted in the completion, e.g., tubing 16.

The workstring is positioned in the completion, e.g., tubing 16, such that the intervention male inductive coupler 220 is aligned with, e.g., radially aligned with and/or at generally or about the same axial depth as, the female inductive coupler 110. Such an intervention would not require electrical wiring from the male coupler 220 to the surface. Instead, power and telemetry is provided via the female coupler 110 once the production/intervention male coupler 220 is aligned with (e.g., radially aligned with or placed at the same or about the same axial depth as) the female coupler 110. In some configurations, the female inductive coupler 110 can transmit and/or receive power and/or telemetry data to or from the surface via wire 130*a*. The intervention male inductive coupler 220 can transmit and/or receive power and/or telemetry data to or from the female inductive coupler 110. The contingency electric safety valve 222 can transmit and/or receive power and/or telemetry data to or from the intervention male inductive coupler 220 via wire 132.

As shown, the workstring can include a workstring tubing 216. The workstring tubing 216 can extend between the intervention male inductive coupler 220 and the contingency electric safety valve 222. In other words, the intervention male inductive coupler 220 and the contingency electric safety valve 222 can be disposed along and/or coupled to the workstring tubing 216, for example, at opposite ends of the workstring tubing 216. The wire(s) 132 can be disposed outside of an extend along an exterior of the workstring tubing 216. The production/intervention male coupler 220 and contingency safety valve 222 can be deployed on, for example, a drillpipe that can be disconnected, and then left behind.

As shown in FIG. 5, the contingency electric safety valve 222 can be positioned at least partially below, lower than, or downhole of the electric safety valve 22. This arrangement directs production fluid flow through the contingency electric safety valve 222 (and possibly through workstring tubing 216), bypassing the failed electric safety valve 22.

In some variations, the female inductive coupler 110 is made of or includes a simple monocable (instead of a twisted pair) that allows for transmission of power but not telemetry. Such a configuration would allow for a simple on/off electric safety valve 22, 222. In some configurations in which a completion includes a primary and redundant actuator on the electric safety valve tool, the primary actuator can be connected directly to the tubing hanger 15, and the redundant actuator can be connected to the female inductive coupler 110. Such a configuration allows for flexibility of deployment and intervention. Alternatively, a completion could include two female couplers 110, such that the primary and redundant actuators are the same. Only one male coupler assembly would be required for intervention. Selective no-go equipment (PSLT) can locate onto the desired female coupler 110.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A well completion comprising:
   a tubing hanger;
   a first tubing extending from the tubing hanger;
   an electric safety valve disposed along the first tubing;
   a female inductive coupler disposed along the first tubing between the tubing hanger and the electric safety valve; and
   a workstring configured to be disposed within the first tubing during an intervention operation of the well completion, the workstring comprising:
      a workstring tubing;
      an intervention male inductive coupler coupled to the workstring tubing, the workstring disposed within the first tubing such that the intervention male inductive coupler is aligned with the female inductive coupler;
      a contingency electric safety valve coupled to the workstring tubing, wherein the workstring tubing extends between the intervention male inductive coupler and the contingency electric safety valve; and
      a wire connecting the intervention male inductive coupler to the contingency electric safety valve, wherein the wire at least partially extends along an exterior of the workstring tubing, wherein the wire is configured to transmit power to the contingency electric safety valve.

2. The well completion of claim 1, wherein the electric safety valve comprises a valve and an actuator.

3. The well completion of claim 2, wherein the actuator is an electro-hydraulic pump.

4. The well completion of claim 2, wherein the actuator is an electro-hydraulic actuator.

5. The well completion of claim 2, wherein the actuator is an electro-mechanical actuator.

6. The well completion of claim 2, wherein the actuator is a primary actuator, and the electric safety valve further comprises a redundant actuator.

7. The well completion of claim 6, wherein the primary actuator is connected to the tubing hanger and the redundant actuator is connected to the female inductive coupler.

8. The well completion of claim 1, wherein the electric safety valve comprises a flapper valve.

9. The well completion of claim 1, wherein an outer diameter of the contingency electric safety valve is smaller than an inner diameter of the electric safety valve.

10. A method of intervention using the well completion of claim 1 when the electric safety valve fails, the method comprising:
    deploying the workstring in the first tubing until the intervention male inductive coupler is aligned with the female inductive coupler;
    providing the power to the contingency electric safety valve via the intervention male inductive coupler and the female inductive coupler; and
    providing the telemetry to and from the contingency electric safety valve via the intervention male inductive coupler and the female inductive coupler.

11. A method of deploying a well completion, the method comprising:

disposing a first tubing string in a well, the first tubing string comprising an electric safety valve and a female inductive coupler disposed above the electric safety valve;

inserting a service male inductive coupler within the first tubing string such that the service inductive male coupler is aligned with the female inductive coupler;

retrieving the service male inductive coupler;

transferring power to the electric safety valve via a wired connection between a surface and the electric safety valve;

transferring telemetry to and from the electric safety valve via the wired connection between the surface and the electric safety valve;

deploying a workstring into the first tubing string, the workstring comprising an intervention male inductive coupler and a contingency electric safety valve;

aligning the intervention male inductive coupler with the female inductive coupler, wherein a first wire connects the intervention male inductive coupler to the contingency electric safety valve;

transferring power to the contingency electric safety valve via the first wire between the contingency electric safety valve and the intervention male inductive coupler and via an inductive coupling between the female inductive coupler and the intervention male inductive coupler; and transferring telemetry to and from the contingency electric safety valve via the first wire between the contingency electric safety valve and the intervention male inductive coupler and via the inductive coupling between the female inductive coupler and the intervention male inductive coupler.

12. The method of claim 11, further comprising:

transferring power to the electric safety valve via the female inductive coupler and the service male inductive coupler; and transferring telemetry to and from the electric safety valve via the female inductive coupler and the service male inductive coupler.

13. The method of claim 11, wherein:

transferring the power to the electric safety valve via the wired connection between the surface and the electric safety valve comprises transferring the power via a second wire extending from a tubing hanger to the female inductive coupler and a third wire extending from the female inductive coupler to the electric safety valve; and transferring the telemetry to and from the electric safety valve via the wired connection between the surface and the electric safety valve comprises transferring the telemetry via the second wire extending from the tubing hanger to the female inductive coupler and the third wire extending from the female inductive coupler to the electric safety valve.

14. The method of claim 11, wherein:

the workstring further comprises a workstring tubing;

the workstring tubing extends between the intervention male inductive coupler and the contingency electric safety valve; and the wire at least partially extends along an exterior of the workstring tubing.

15. A method of intervention for a well completion, the method comprising:

deploying a workstring within a first tubing of the well completion, the well completion comprising an electric safety valve and a female inductive coupler positioned along the first tubing, and the workstring comprising an intervention male inductive coupler, a contingency electric safety valve, and a wire extending between and connecting the intervention male inductive coupler and the contingency electric safety valve;

positioning the workstring within the first tubing such that the intervention male inductive coupler is aligned with the female inductive coupler;

transferring power to the contingency electric safety valve via the wire; and transferring telemetry to and from the contingency electric safety valve via the wire.

16. The method of claim 15, further comprising positioning the workstring within the first tubing such that the contingency electric safety valve is positioned at least partially below the electric safety valve such that production fluid flows through the contingency electric safety valve, bypassing the electric safety valve.

17. The method of claim 15, further comprising:

transferring power to the wire via the intervention male inductive coupler and the female inductive coupler; and transferring telemetry to and from the wire via the intervention male inductive coupler and the female inductive coupler.

18. The method of claim 15, wherein:

the workstring further comprises a workstring tubing;

the workstring tubing extends between the intervention male inductive coupler and the contingency electric safety valve; and the wire at least partially extends along an exterior of the workstring tubing.

\* \* \* \* \*